March 8, 1966  H. O. HENZE  3,239,162
FRICTION DRIVE ADJUSTMENT FOR A FISHING REEL
Filed Jan. 16, 1963
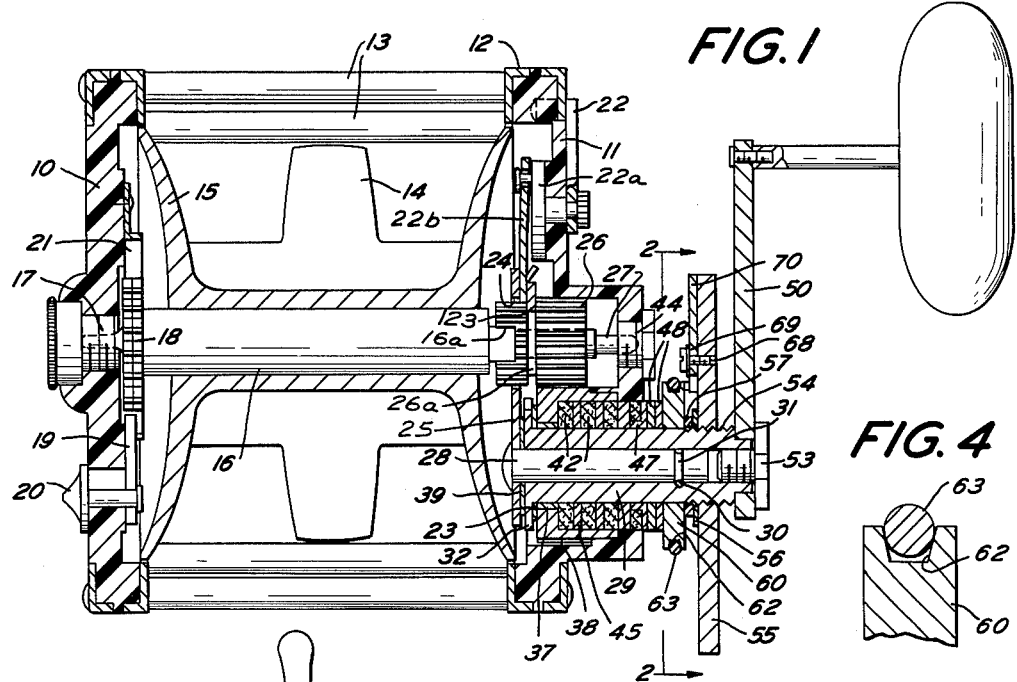
FIG. 1
FIG. 4
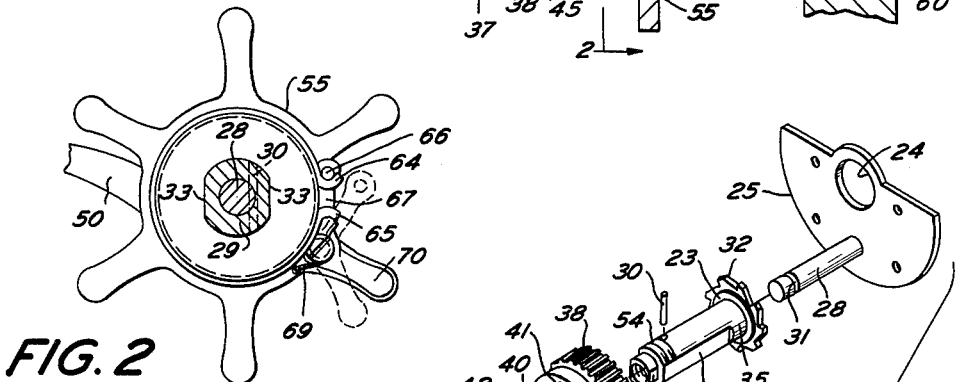
FIG. 2
FIG. 3
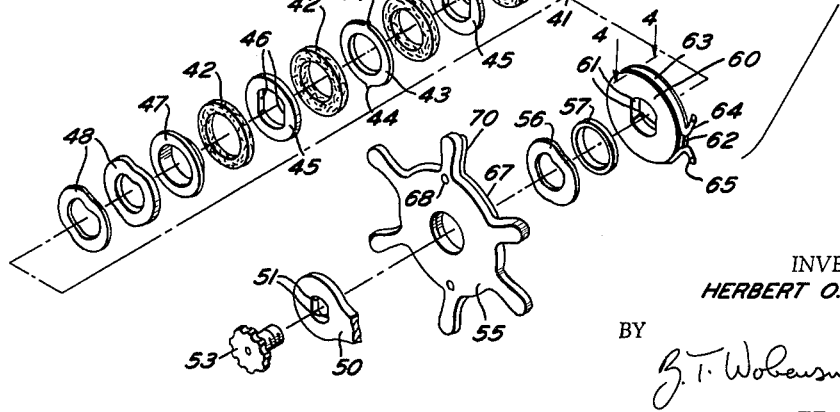
INVENTOR.
HERBERT O. HENZE
BY
ATTORNEY United States Patent Office 3,239,162
Patented Mar. 8, 1966

3,239,162
FRICTION DRIVE ADJUSTMENT FOR A FISHING REEL
Herbert O. Henze, Philadelphia, Pa., assignor to Penn Fishing Tackle Mfg. Co., Philadelphia, Pa., a corporation of Pennsylvania
Filed Jan. 16, 1963, Ser. No. 251,894
4 Claims. (Cl. 242—84.45)

This invention relates to fishing reels and more particularly to apparatus for controlling the drag.

It has heretofore been proposed to provide a braking mechanism on the reel which controls the rotation of the reel spool and to provide an external wheel, frequently referred to as a star wheel, for adjusting the braking action and accordingly the tension applied on the line. One such reel is shown in Patent No. 1,940,593. A wide range of tension is available but resetting to a preselected tension is difficult.

It is the principal object of the present invention to provide a simple but effective setting or positioning device for the drag adjusting wheel.

It is a further object of the present invention to provide in association with the brake mechanism of a fishing reel an adjustable stop for determining the positioning of the manually operable exteriorly accessible brake adjusting wheel.

It is a further object of the present invention to provide, in association with the brake mechanism of a fishing reel, a stop for determining the brake mechanism adjustment which can be quickly and easily positioned at the desired location and readily reset if desired.

It is a further object of the present invention to provide a stop of the character aforesaid which is placed in the reel at a location which is accessible but does not introduce any hazards, in use.

It is a further object of the present invention to provide a stop of the character aforesaid which does not introduce any unnecessary complications in the construction of the reel.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical central sectional view of a fishing reel having thereon the stop of the present invention;

FIG. 2 is a transverse vertical sectional view taken approximately on the line 2—2 of FIG. 1;

FIG. 3 is an exploded perspective view of the braking mechanism having the stop of the present invention thereon; and FIG. 4 is an enlarged fragmentary sectional view taken approximately on the line 4—4 of FIG. 3.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, a fishing reel of well known type is shown having opposite side plates 10 and 11 received in a frame 12 which has spacer posts 13. The frame 12 can have a reel stand 14 carried thereby.

A spool 15 is provided carried on a spool shaft 16. The spool shaft 16, at one end is journaled in a bearing 17 in the side plate 10 and may have a ratchet wheel 18 thereon for selective engagement by a click tongue 19, positioned by a click button 20 and resiliently engaged by a spring 21, of well known type, such as that illustrated in Patent No. 1,940,593.

The spool shaft 16 at the other end extends through an opening 24 in a gear bridge plate 25 with a flattened end 16a for separable engagement in a complemental end opening in a gear 26. The gear 26 is slidably mounted on a shaft 27 carried by the side plate 11 and is positioned in a well known manner by an exteriorly accessible eccentric lever 22 which positions an eccentric 22a. The eccentric 22a engages an eccentric jack 22b which in turn positions a pinion yoke 123 engaging in a slot 26a in the gear 26. The gear bridge plate 25 is secured to the interior of the side plate 11 and has a journal rod 28 secured thereto.

The journal rod 28 has sleeve shaft 29 rotatably mounted thereon and held against longitudinal axial displacement by a holding pin 30 which engages in a groove 31 on the rod 28.

The sleeve shaft 29 has a ratchet wheel 32 thereon for engagement by a pawl (not shown) and a wear washer 23 carried thereon. The sleeve shaft 29 has flats 33 thereon extending from a cylindrical portion 35 contiguous to the ratchet wheel 32. A brake drum 36 rotatably mounted on a sleeve 37 on the cylindrical portion 35 has gear teeth 38 on the exterior meshing with the teeth of the gear 26. A washer 39 can be interposed between the end of the drum 36 and the ratchet wheel 32. The drum 36 has a hollow interior 40 with longitudinal grooves 41. Within the interior 40 of the drum 36, a plurality sequentially arranged discs 42 of friction brake lining materials keyed discs or washers 43 having key projections 44 engaging in the grooves 41, and slotted discs or washers 45 having flats 46 engaging the flats 33, are provided at the outer end a collar 47 is provided with which spring washers 48 engage.

At the outer end of the sleeve shaft 29 a handle 50 is mounted with keying flats 51 engaging flats 52 on the sleeve shaft 29. A handle lock screw 53 in threaded engagement in the end of the sleeve shaft 29 retains the handle 50 in place. The sleeve shaft 29 has an extra threaded portion 54 for the reception of a brake or drag adjusting star wheel 55. Turning of the star wheel 55 on the threaded portion 54 moves the star wheel 55 closer to or further away from the brake drum 36. A spring washer 56 on the sleeve shaft 29 is in engagement with the inner face of the star wheel 55 and is in turn in engagement with a spacer collar 57. The collar 57 is in engagment with a stop mounting disc 60 which has interior flats 61 for engagement with the flats 33. The mounting disc 60 engages the spring washers 48.

The stop mounting disc 60 and its associated structure are an important feature of the invention. The disc 60 has a peripheral groove 62 with tapered sides for the reception of a stop ring 63. The stop ring 63 has spaced end hooks 64 and 65 at the ends thereof.

The star wheel 55 has an abutment or stop pin 66 which advantageously is mounted on a lever 67. The lever 67 is pivotally mounted on the star wheel 55 by a pivot pin 68 and a spring 69 normally urges the lever 67 to a position such that the abutment pin 66 is slidable along the periphery of the stop ring 63 until it engages in the hook 64. Such engagement has a locking action on the stop ring 63 so that further movement of the pin 66 can only be effected by the application of a considerable force.

The lever 67 has an arm 70 extending therefrom to permit the lever 67 to be swung to a position so that the pin 66 is clear of the hook 64. Upon further movement of the star wheel 55 with the pin 66 elevated it can be moved by movement of the star wheel 55 so as to be between the hook 64 and the outturned end 65 to push in either direction, or beyond the outturned end 65 to push thereagainst. The stop ring 63 can thus be positioned as desired to locate the hook 64 to provide a stop for adjustment of the brake discs 42, washers 43 and washers 45 to apply the desired drag onto the spool 15 and the fishing line thereon.

The mode of operation should be apparent from the foregoing but it may be noted that the reel is operated in the customary manner.

Turning of the handle 50 is effective through the sleeve shaft 29, the brake drum 36 with the friction discs 42, slotted washers 45 and keyed washers 43 in sufficiently tight frictional engagement for rotation of the brake drum 36 the teeth 38 and the gear 26 for turning the spool shaft 16 and the spool thereon in the winding direction as permitted by the ratchet wheel 32.

Unwinding of the line from the spool 15 is determined by the drag on the rotation of the spool 15 as determined by the adjustment of the star wheel 55.

The positioning of the star wheel 55 on the threaded exterior portion 54, through the spring washer 56, the spacer collar 57, the stop mounting disc 60, the spring washers 48 and the collar 47, determines the spacing of the friction discs 42, the keyed washers 43 and slotted washers 45, within the inner end face 40 of the brake drum 36. The brake drum 36 is itself restrained against longitudinal axial movement by its bearing on the washer 23 which in turn bears on the ratchet wheel 32. The ratchet wheel 32 provides an abutment for brake tightening to the desired extent.

The tightening of the discs and washers 42, 43 and 45 is advantageously related to a fixed location or limit, adjustable as desired, and the stop ring 63 on the stop mounting disc 60 is particularly suitable for this purpose. The stop ring 63 can be shifted to the desired position in the groove 62. This is accomplished by tilting the arm 70, moving the abutment or stop pin 66 beyond the hook 64 and either between the hook 64 and the hook 65 or beyond the hook 65 and shifting the ring 63 by movement of the stop pin 66 with the star wheel 55. The hook 64 can thus be positioned at any selected location so that it is available upon return of the stop pin 66 in advance thereof to catch and hold the pin 66.

I claim:

1. In a fishing reel having a spool, a handle for rotating said spool, operating connections between said handle and said spool including a shaft to which said handle is secured and an adjustable friction device on said shaft, an exteriorly accessible manually operable wheel, means mounting said wheel for movement on said shaft for adjusting said friction device, and an adjustable stop means having a member carried by said wheel and an abutment member carried by said shaft engageable with said first member for limiting the movement of said wheel, said wheel carried member being movably mounted on said wheel for retraction from abutment engaging position.

2. In a fishing reel having a spool, a handle for rotating said spool, operating connections between said handle and said spool including a shaft to which said handle is secured and an adjustable friction device on said shaft, an exteriorly accessible manually operable wheel, means mounting said wheel for movement on said shaft for adjusting said friction device, an adjustable stop means having a member carried by said wheel and an abutment member carried by said shaft engageable with said first member for limiting the movement of said wheel, said shaft carried member including a stop ring, means mounting said stop ring for movement relative to said shaft, means mounting said wheel carried member for movement on said wheel from a position engageable with said stop ring to a second position out of the path of movement of said ring, and resilient means yieldably urging said wheel carried member to said position engageable with said stop ring.

3. In a fishing reel having a spool, a handle for rotating said spool, operating connections between said handle and said spool including a shaft to which said handle is secured and an adjustable friction device on said shaft, an exteriorly accessible manually operable wheel, means mounting said wheel for movement on said shaft for adjusting said friction device, an adjustable stop means having a member carried by said wheel and an abutment member carried by said shaft engageable with said first member for limiting the movement of said wheel, said shaft carried member including a disc having a peripheral groove and a stop ring movably mounted in said groove, said disc and groove mounting said stop ring for movement relative to said shaft, means mounting said wheel carried member for movement on said wheel from a position engageable with said stop ring to a second position out of the path of movement of said ring, and resilient means yieldably urging said wheel carried member to said position engageable with said stop ring.

4. In a fishing reel having a spool, a handle for rotating said spool, operating connections between said handle and said spool including a shaft to which said handle is secured and an adjustable friction device on said shaft, an exteriorly accessible manually operable wheel, means mounting said wheel for movement on said shaft for adjusting said friction device, an adjustable stop means having a member carried by said wheel and an abutment member carried by said shaft engageable with said first member for limiting the movement of said wheel, said shaft carried member including a disc keyed to said shaft and longitudinally axially movable thereon, said disc having a peripheral groove, said shaft carried member including a stop ring mounted in said groove for movement relative to said shaft, means mounting said wheel carried member for movement on said wheel from a position engageable with said stop ring to a second position out of the path of movement of said ring, and resilient means yieldably urging said wheel carried member to said position engageable with said stop ring.

References Cited by the Examiner

UNITED STATES PATENTS

| | | | |
|---|---|---|---|
| 1,940,593 | 12/1933 | Henze | 242—84.54 |
| 2,197,779 | 11/1940 | Coxe | 242—84.44 |
| 2,760,357 | 8/1956 | Burns | 242—84.45 X |
| 2,925,964 | 2/1960 | Holahan | 242—84.54 |
| 3,097,814 | 7/1963 | Sarah | 242—84.54 |

MERVIN STEIN, *Primary Examiner.*